United States Patent [19]

Bandel et al.

[11] 3,711,155
[45] Jan. 16, 1973

[54] CUSHIONED SEAT, ESPECIALLY MOTOR VEHICLE SEAT WITH QUILTING

[75] Inventors: Kurt Bandel, Monchberg; Walter Bärtle, Sindelfingen; Ewald Günther, Dagersheim; Adolf Honegg, Datzingen; Heinz Stahl, Sindelfingen (Wurttemberg), all of Germany

[73] Assignee: Daimler-Benz Aktiengesellschaft, Stuttgart-Unterturkheim, Germany

[22] Filed: Dec. 4, 1970

[21] Appl. No.: 95,090

[30] Foreign Application Priority Data

Dec. 4, 1969 Germany...................P 19 60 831.2

[52] U.S. Cl. ...................297/456, 297/219, 5/354
[51] Int. Cl. ...........................A47c 27/08, A47c 27/18
[58] Field of Search......297/218, 219, 229, 253, 452, 297/453, 455, DIG. 2; 5/347, 353.14, 356, 354

[56] References Cited

UNITED STATES PATENTS

| | | | |
|---|---|---|---|
| 3,014,226 | 12/1961 | Wilfert | 5/347 |
| 3,102,755 | 9/1963 | Wilfert | 297/229 |
| 2,007,075 | 7/1935 | Clements | 297/253 |
| 3,391,413 | 7/1968 | Crane et al. | 297/453 |
| 3,513,492 | 5/1970 | Phillips | 297/453 |
| 3,083,496 | 4/1963 | Feinerman | 297/455 X |

*Primary Examiner*—Casmir A. Nunberg
*Attorney*—Craig and Antonelli

[57] ABSTRACT

A cushioned seat, especially a motor vehicle seat, in which the seat cushion and also possibly the back rest essentially consists of a spring box, of a molded cushion support arranged on the spring box and of a cover that is interrupted by wedge-like folds or the like; the cover also includes quilts whereby a band or tape is secured at the place of the quilting on the wedge-like folds or the like of the cover while the molded cushion support is provided with an indentation and the band is secured in this indentation.

15 Claims, 6 Drawing Figures

PATENTED JAN 16 1973  3,711,155

INVENTORS
KURT BANDEL
WALTER BARTLE
EWALD GÜNTHER
ADOLF HONEGG
HEINZ STAHL

BY Craig, Antonelli, Stewart & Hill
ATTORNEYS

CUSHIONED SEAT, ESPECIALLY MOTOR VEHICLE SEAT WITH QUILTING

The present invention relates to a cushioned seat, especially to a motor vehicle seat, in which the seat cushion and possibly also the backrest essentially consist of a spring box, of a shaped or molded cushion support part arranged thereon and of a cover which is interrupted by tufts or welded-on folds, or the like and which includes a quilting.

The present invention is concerned with the task to provide a quilting that can be carried out easily, inexpensively and time-savingly and which also can be applied especially to cushioned seats in which the spring boxes are closed and therefore no possibility exists to extend the quilting through the spring box.

The underlying problems are solved according to the present invention in that a band is secured at the wedge-like folds or tufts, welded-on folds or the like of the cover at the place of the quilts, in that a recess is provided in the cushion support and in that the band is secured in this recess.

It is achieved by the present invention that the quilting can be undertaken already when the completely ready-made cover is secured onto the molded or shaped cushion support, i.e., at a time when all parts are readily accessible. Additionally, it is possible to carry out the quilting with a seat cushion that includes a spring box closed at the bottom because it is not necessary to take any measures whatsoever which require extension through the spring box.

In an advantageous construction of the inventive concept, the band may be secured at each quilting point in the recess of the molded cushion support by means of staples or the like. However, according to another feature of the present invention it is also possible to pull the band through apertures provided in the recess of the molded cushioned part at each quilting point and to hold fast the thus produced loops by one or several securing members.

The loops can be held by curved clamping strips or the like inserted into each loop under stress and preferably consisting of synthetic resinous material. However, the loops may also be held fast by a fastening element inserted into each loop which preferably consists of synthetic resinous material and is constructed band- or rod-shaped.

The recess in the shaped or molded cushioned support may be reinforced by an additional element, for example, by a glued-on jute strip.

Accordingly, it is an object of the present invention to provide a quilted cushioned seat, especially for motor vehicle seats, which avoids by simple means the aforementioned shortcomings and drawbacks encountered in the prior art.

Another object of the present invention resides in a cushioned seat, especially a motor vehicle seat, which permits the realization of quilts in the seat in an easy, inexpensive and time-saving manner.

A further object of the present invention resides in a quilted seat cushion that can be readily fabricated and assembled notwithstanding the use of a closed spring box.

These and further objects, features, and advantages of the present invention will become more obvious from the following description when taken in connection with the accompanying drawing which shows, for purposes of illustration only, several embodiments in accordance with the present invention, and wherein.

Figure 4:
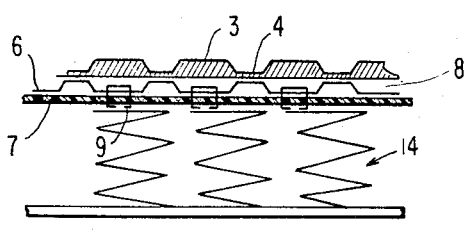
Figure 5:
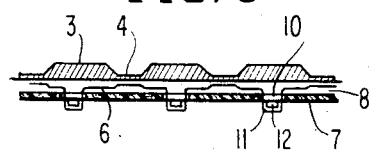
Figure 6:
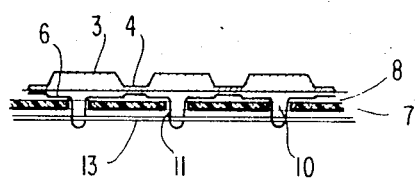

FIG. 4 is a somewhat schematic partial cross-sectional view through the quilted seat in accordance with the present invention in which the quilts are secured at the molded cushion support by means of staples; and FIGS. 5 and 6 are somewhat schematic partial cross-sectional views, similar to FIG. 4, and illustrating quilts with loops that are secured at the molded cushion support by means of securing elements.

Figure 1:
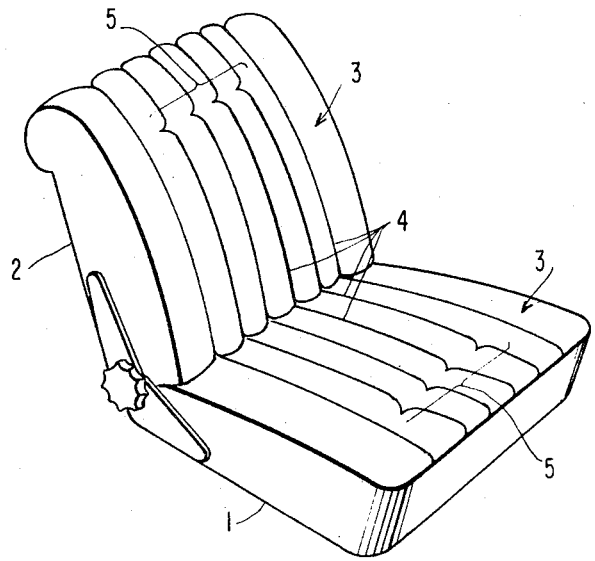
FIG. 1 is a perspective view of a motor vehicle seat with quilts.

Referring now to the drawing wherein like reference numerals are used throughout the various views to designate like parts, and more particularly to FIG. 1, the motor vehicle seat illustrated in this figure essentially consists of a seat cushion 1 and of a back rest 2. The covers 3 of the seat cushion 1 and of the back rest 2 are provided with wedge-like folds or tufts 4. Additionally, the two covers 3 include quilts 5.

Figure 2:
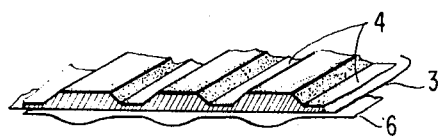
FIG. 2 is a partial cross-sectional view, on an enlarged scale, through the seat cover with the band secured thereon in accordance with the present invention.
Figure 3:
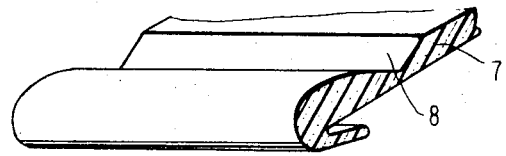
FIG. 3 is a partial perspective view of a molded cushion support for use with the seat in accordance with the present invention.

In order to be able to carry out the quilts 5 inexpensively and time-savingly, above all also when, for example, the spring box associated with the seat cushion 1 is closed in the downward direction and no possibility exists to have access to the cover 3 through the spring box and the cushion support arranged thereon, the following measures are taken according to FIGS. 2 to 4.

A textile or fabric band or tape 6 of any suitable material is secured to the cover 3 according to FIG. 2 at the tufts or wedge-like folds 4 at the places thereof where the quilts are to be provided. This band 6 is disposed transversely to the wedge-like folds or tufts 4 and is appropriately secured at the cover 3 simultaneously with the fabrication of the tufts 4. According to FIG. 3, the shaped or molded cushion support part 7, which consists, for example, of a rubber-hair mat or of a foamed molding from any suitable formed synthetic resinous material, such as foamed rubber, is provided with a recess or indentation 8 at the place of the quilts 5 which possibly may be reinforced by a glued-in band, for example, a jute strip. The ready-made cover 3 according to FIG. 2 is then secured according to FIG. 4 on the molded cushion support 7 arranged on the spring box 14 in that the band 6 is clamped or stapled on in the recess 8 by means of a staple 9 at each quilting point. The stapling may take place advantageously by means of a conventional multiple stapling machine. The completion of the cushion then takes place in the usual manner.

According to FIGS. 5 and 6, the quilting may also be carried out in such a manner that the band 6 is pulled through apertures 10 in the recess 8 of the molded cushion support 7 so that loops 11 result. The band 6 is thereby held in the recess 8 according to FIG. 5 by individual stressed clamping or retaining members 12 which are inserted into the loops 11 whereby the clamping or retaining members 12 are disposed transversely to the band 6. However, it is also possible according to FIG. 6 to insert through all loops 11 a rod-shaped securing or retaining member 13 disposed in the longitudinal direction of the band 6.

While we have shown and described several embodiments in accordance with the present invention, it is understood that the latter is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A cushioned seat comprising a seat cushion including a spring box, a shaped cushion support arranged on said spring box, and a cover having wedge-like folds extending in a first direction of the seat, said cushion support being provided with a recess extending in a second direction transverse to the first direction, and a band extending in the second direction being secured at the wedge-like folds of the cover and at said cushion support within the area of said recess to effect a quilting of the cover in the region of the places of securement of said band to said wedge-like folds, said quilting extending in the second direction.

2. A cushioned seat according to claim 1, further comprising a back rest having a quilting similar to the quilting on said seat cushion.

3. A seat according to claim 1, characterized in that the band is secured in the recess of the cushioned support at each quilting point by means of staples.

4. A seat according to claim 1, characterized in that the band is pulled through apertures provided in the recess of the cushion support at each quilting point and the resulting loops are retained by at least one retaining means.

5. A seat according to claim 4, characterized in that several retaining means are provided.

6. A seat according to claim 4, characterized in that the loops are retained by curved retaining members inserted through every loop.

7. A seat according to claim 6, characterized in that the curved retaining members essentially consist of synthetic resinous material.

8. A seat according to claim 4, characterized in that the loops are retained by a retaining means inserted into each loop, and in that said retaining means is of band-shaped construction.

9. A seat according to claim 8, characterized in that said retaining means is made from synthetic resinous material.

10. A seat according to claim 4, characterized in that the loops are retained by a retaining means inserted through each loop, and in that said retaining means is constructed rod-shaped.

11. A seat according to claim 10, characterized in that said retaining means is made from synthetic resinous material.

12. A seat according to claim 1, characterized in that the recess in the cushion support is reinforced by an additional member.

13. A seat according to claim 12, characterized in that said additional member is a glued-on jute strip.

14. A seat according to claim 13, characterized in that the band is secured in the recess of the cushion support at each quilting point by means of staples.

15. A seat according to claim 13, characterized in that the band is pulled through apertures provided in the recess of the cushion support at each quilting point and the resulting loops are retained by at least one retaining means.

* * * * *